(12) United States Patent
Gupta et al.

(10) Patent No.: US 10,370,950 B2
(45) Date of Patent: *Aug. 6, 2019

(54) METHOD OF ENHANCING CONDUCTIVITY FROM POST FRAC CHANNEL FORMATION

(71) Applicant: Baker Hughes, a GE company, LLC, Houston, TX (US)

(72) Inventors: D. V. Satyanarayana Gupta, The Woodlands, TX (US); Ahmed M. Gomaa, Tomball, TX (US); Scott Gregory Nelson, Cypress, TX (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/905,352

(22) Filed: Feb. 26, 2018

(65) Prior Publication Data
US 2018/0230789 A1 Aug. 16, 2018

Related U.S. Application Data

(63) Continuation-in-part of application No. 15/161,226, filed on May 21, 2016, now Pat. No. 9,902,898.

(51) Int. Cl.
*E21B 43/267* (2006.01)
*C09K 8/80* (2006.01)
(Continued)

(52) U.S. Cl.
CPC .............. *E21B 43/267* (2013.01); *C09K 8/62* (2013.01); *C09K 8/685* (2013.01); *C09K 8/70* (2013.01);
(Continued)

(58) Field of Classification Search
CPC ....... E21B 43/267; E21B 43/261; C09K 8/80; C09K 8/68; C09K 8/805; C09K 2208/08
See application file for complete search history.

(56) References Cited

U.S. PATENT DOCUMENTS 7,210,528 B1    5/2007  Brannon et al.
8,205,675 B2    6/2012  Brannon et al.
(Continued)

FOREIGN PATENT DOCUMENTS

RU        2644807 C1 *  2/2018
WO     2012/170522 A2   12/2012
WO     2015/048021 A2    4/2015

OTHER PUBLICATIONS

Int'l Search Report and Written Opinion of the International Searching Authority; International Application No. PCT/US2017/030298, Aug. 9, 2017.

*Primary Examiner* — Zakiya W Bates
(74) *Attorney, Agent, or Firm* — John Wilson Jones; Jones Delflache LLP

(57) ABSTRACT

A method of enhancing conductivity within a hydrocarbon-bearing reservoir by building proppant pillars in a spatial arrangement in fractures created or enlarged in the reservoir. Two fluids of differing stability are simultaneously pumped into the reservoir. The fluids may contain identical proppant mixtures which include a first proppant which has an apparent specific gravity less than the apparent specific gravity of a second proppant. The fluids may contain identical proppants mixtures where the average particle size of a first proppant is greater than the average particle size of a second proppant. Vertically extending pillars are created within the formation when the fluids are destabilized and the first proppant is then released from the destabilized fluids. The area between the pillars may be held open by the presence of the second proppant in the remaining fluid. Fluid produced from the hydrocarbon-bearing reservoir is then flowed at least partially through channels between the vertically extending pillars.

20 Claims, 2 Drawing Sheets

(51) Int. Cl.
*C09K 8/62* (2006.01)
*C09K 8/68* (2006.01)
*C09K 8/70* (2006.01)
*C09K 8/88* (2006.01)
*C09K 8/92* (2006.01)

(52) U.S. Cl.
CPC .................. *C09K 8/80* (2013.01); *C09K 8/88* (2013.01); *C09K 8/887* (2013.01); *C09K 8/92* (2013.01); *C09K 2208/26* (2013.01)

(56) References Cited

U.S. PATENT DOCUMENTS

| | | |
|---|---|---|
| 8,936,083 B2 | 1/2015 | Nguyen |
| 9,429,006 B2 | 8/2016 | Brannon et al. |
| 9,902,898 B2 * | 2/2018 | Nelson .................... C09K 8/80 |
| 2008/0182761 A1 | 7/2008 | Stephenson et al. |
| 2012/0125617 A1 | 5/2012 | Gu et al. |
| 2014/0251626 A1 | 9/2014 | Gomaa et al. |
| 2014/0290943 A1 | 10/2014 | Ladva et al. |
| 2014/0299318 A1 | 10/2014 | Crews et al. |
| 2015/0053403 A1 | 2/2015 | Potapenko et al. |
| 2015/0075797 A1 | 3/2015 | Jiang et al. |
| 2015/0083420 A1 | 3/2015 | Gupta et al. |
| 2015/0232750 A1 | 8/2015 | Kanj et al. |
| 2016/0340573 A1 | 11/2016 | Semenov et al. |
| 2017/0051599 A1 | 2/2017 | Bestaoui-Spurr et al. |

* cited by examiner

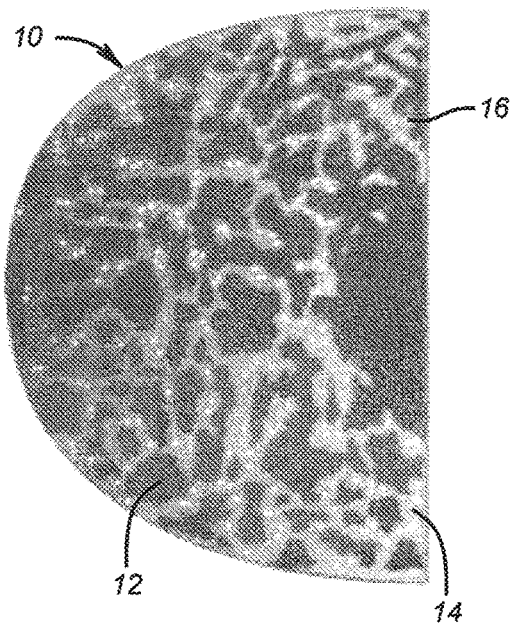
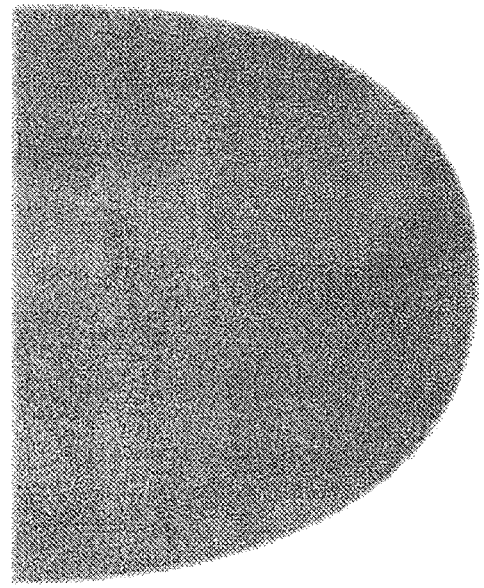
FIG. 1A  FIG. 1B
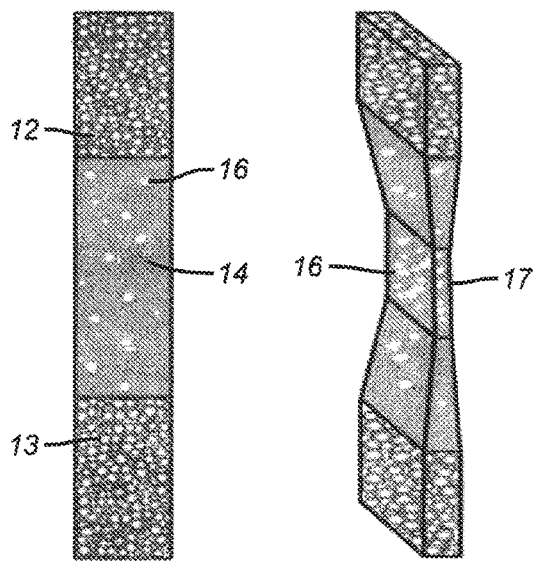 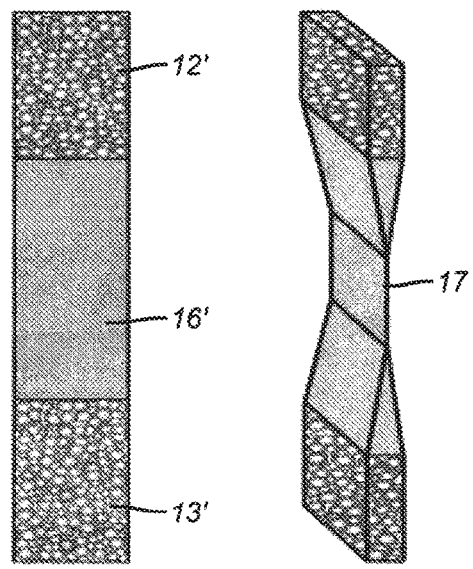
FIG. 2A  FIG. 2B  FIG. 2C  FIG. 2D

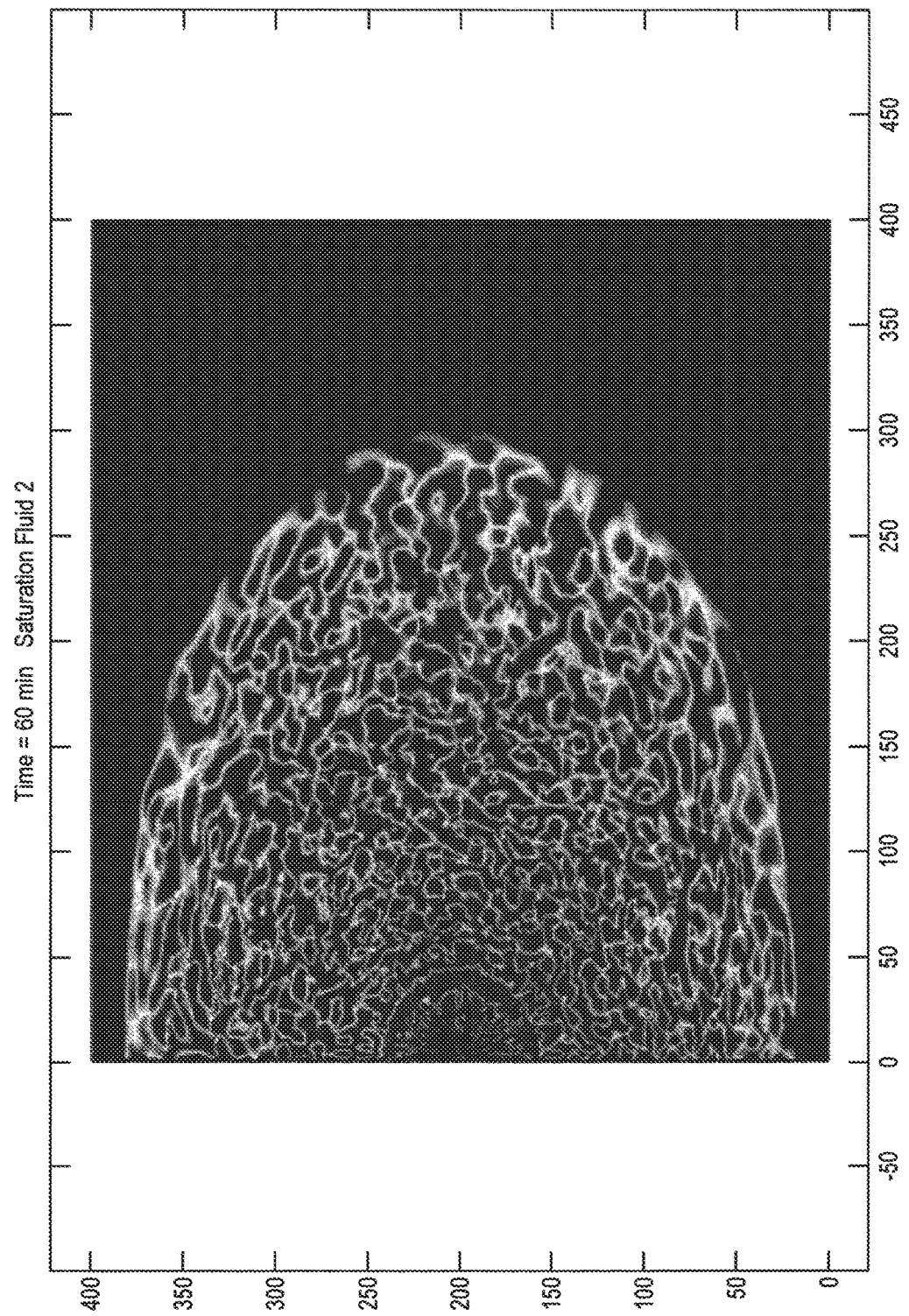

METHOD OF ENHANCING CONDUCTIVITY FROM POST FRAC CHANNEL FORMATION

This application is a continuation-in-part application of U.S. patent application Ser. No. 15/161,226 filed on May 21, 2016, herein incorporated by reference.

FIELD OF THE DISCLOSURE

The disclosure relates to a method of enhancing conductivity within a subterranean formation by forming proppant pillars and creating flow channels in between the pillars.

BACKGROUND OF THE DISCLOSURE

During stimulation (such as hydraulic fracturing) of a subterranean reservoir, a fluid is pumped into the well which penetrates the reservoir at a pressure which is sufficient to create or enlarge a fracture within the reservoir. During fracturing, vertical fracture faces are held apart by the pumping of pressurized fluid. However, when the treatment ends and the hydraulic pressure is no longer present, the fracture opening closes under the influence of tectonic stresses.

Productivity of a hydraulic fracturing treatment operation is dependent on the effectiveness of the propping agent present in the fracturing fluid within conductive fractures. The proppant serves to prevent the fracture from closing and to hold the faces of the reservoir apart after the pumping treatment is completed and shut-down occurs. The proppant filled fracture increases the effective drainage radius of the wellbore and increases the producing rate of the well.

Pillar fracturing is a known method of creating proppant free channels in-situ wherein separate islands or "pillars" of proppant are created to hold open a fracture with open or conductive areas between the pillars. Proppant pillars formed in-situ conform to the shape and size of the fracture and unpropped areas as then highly conductive channels. Typically, pillar fracturing consists of pumping step-changed stages into a targeted production zone within the well wherein slugs of a clean fluid are followed by a fluid comprising a mixture of clean fluid and proppant. Conventional methods of alternating clean fluid and proppant laden fluid often result however in a gradual transition of clean fluid and proppant laden fluid rather than the desired sharp step-change.

Often conventional processes of pillar fracturing require the use of hindered settling aids, such as fibers, polymers, or surface bonding agents added to the proppant from within the carrier fluid in order to reinforce and consolidate the proppant in-situ and to inhibit settling of the proppant in the treatment fluid. Typically, the fibers added to both proppant-laden fluid and clean fluid aid to keep discrete proppant pillars intact while also filling the channels between the pillars to help hold the pillars in place. Thus, the fibers inhibit lateral expansion that would otherwise reduce the ultimate height of the pillar. Other processes require adhesive based materials as a settling aid to hold the proppant together in-situ while the fracture closes.

Alternative methods of pillar fracturing are desired. It is desired that such methods be capable of transporting proppant far into the targeted zone of the fracture with a minimum of settling and without requiring the use of hindered settling aids. In addition, alternative methods are desired for creating conductive channels in long fracture lengths which do not result in the transitioning of clean fluid and proppant laden fluid seen in step-change pillar fracturing. Such alternative pillar fracturing methods need to be less cumbersome and more predictable than the step-change fracturing methods presently practiced.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

In an embodiment, a method of enhancing the productivity of hydrocarbons from a hydrocarbon-bearing reservoir is provided where, subsequent to creating or enlarging one or more fractures within the subterranean formation, at least two proppant-laden slurries of varying viscosity and stability are simultaneously pumped into a well penetrating the formation. The viscosity ratio of the more viscous and stable slurry to the less viscous and less stable slurry is a minimum of 1.3:1. The proppant in each of the proppant-laden carrier slurries is the same. The proppant comprises a relatively lightweight proppant having an apparent specific gravity (ASG) less than or equal to 2.45 and a heavier proppant having an apparent specific gravity greater than or equal to 2.65. The less viscous slurry is degraded and the heavier proppant is released from the less viscous slurry. The released heavier proppant is then consolidated from the less viscous slurry in the fracture on an upper portion of the more stable slurry and/or at a pinch point in the width of the fracture. The released heavier proppant is then introduced into the width of the fracture. Two or more pillars are created within the fracture from the released heavier proppant. The more viscous slurry is then degraded and the heavier proppant is released from the more viscous slurry onto the created pillars. A channel is created in the subterranean formation between the pillars with the relatively lightweight proppant in the less viscous slurry and the more viscous slurry.

In another embodiment of the disclosure, a method of enhancing the productivity of hydrocarbons from a hydrocarbon-bearing reservoir is provided wherein, subsequent to the creation or enlargement of fractures within the reservoir, at least two proppant-laden slurries of differing viscosity and stability are simultaneously pumped into the well. The viscosity ratio of the more stable slurry to the less stable slurry is a minimum of 1.3:1. The viscosity ratio enables fingering effects to variably disperse the two slurries within the created or enlarged fracture. The proppant in each of the proppant-laden slurries is the same. Further, the proppant in each of the proppant-laden slurries includes a proppant neutrally buoyant in the fluid of the slurry and a heavier proppant having an apparent specific gravity greater than or equal to 2.45. The amount of neutrally buoyant proppant and heavier proppant in each of the proppant-laden slurries may be the same. The fluid of each of the proppant-laden slurries is also the same. The less viscous slurry is rendered less stable by the presence and/or amount of breaker, crosslinking agent, gel stabilizer, pH buffer or viscosifying agent. The difference in viscosity between the two slurries enables viscous fingering to variably disperse the slurries while they are being pumped. Following the pumping of the hydraulic fracture stimulation, the less viscous slurry is degraded first and vertically extending pillars are created within the formation from the proppant released from the less viscous slurry. The more viscous fluid is then degraded. The volume of proppant within the fracture is increased from the settling of the proppant from the more viscous slurry. A conductive channel is created between the pillars.

In another embodiment, a method of pillar fracturing a hydrocarbon-bearing reservoir is provided wherein, subsequent to the creation or enlargement of fractures within the subterranean formation, at least two slurries of differing viscosity are simultaneously pumped into the wells. Each of the slurries contains the same suspended proppant. The proppant is a mixture of proppant neutrally buoyant in the fluid of the slurry and a heavier proppant having an apparent specific gravity greater than or equal to 2.45. The amount of neutrally buoyant proppant and heavier proppant in each of the at least two proppant-laden slurries may be the same. The shape and/or placement of the proppant pillar to be created within the reservoir is controlled during the simultaneous pumping of the proppant-laden slurries while the proppant-laden slurries, i.e., while the slurries are in a dynamic state. The heavy proppant is first released from the suspension in the less viscous fluid while the less viscous fluid is in a static state. At least two vertically extending pillars are created within the formation from the heavy proppant released from the less viscous slurry. The heavy proppant suspended in the more viscous slurry is then released while the more viscous fluid is in a static state. The proppant released from the more viscous slurry further contributes to the building of the two vertically extending pillars. Conductive channels are created within the subterranean formation between vertically extending pillars. The fracture may be braced open between the pillars with the neutrally buoyant proppant from the more viscous and/or less viscous slurry.

In another embodiment of the disclosure, a method of increasing the conductivity of a fracture network within a subterranean formation penetrated by a well is provided. In this embodiment, after creating one or more fractures in the subterranean formation, two fluids of different viscosity are continuously and simultaneously introduced into the well. The two fluids have identical proppant and a carrier. The proppant comprises a proppant neutrally buoyant in each of the carrier fluids and a heavier proppant not neutrally buoyant in either of the carrier fluids. The less viscous fluid is less stable than the more viscous fluid. Proppant is released from the less viscous fluid and the proppant is allowed to settle within the formation. At least two pillars formed within the formation from the proppant released from the less viscous fluid. A partial monolayer of proppant is formed between the at least two pillars from the neutrally buoyant proppant in the carrier fluid of the more viscous fluid and the carrier fluid of the less viscous fluid. The partial monolayer inhibits fracture closure.

In another embodiment of the disclosure, a method of increasing the conductivity of a fracture network within a subterranean formation is provided wherein, subsequent to the creation or enlargement of a fracture, two fluids of different viscosity are continuously and simultaneously introduced into the well penetrating the formation. The two fluids are composed of a mixture of the same proppants which are suspended in a carrier. The carrier in each of the fluids is the same. The concentration of proppant in the two fluids may or may not be the same. One of the proppants in the mixture in each of the fluids is neutrally buoyant in the carrier of the fluid. A heavier proppant in each of the fluids is not neutrally buoyant in the carrier. The less viscous fluid is less stable than the more viscous fluid. The heavier proppant is released from the less viscous fluid first and falls due to gravitational forces within the created fracture until coming to rest on top of the more stable fluid positioned in the fracture and/or at a pinch point in the width of the fracture. At least two pillars are formed within the formation from the proppant released from the less viscous fluid as well as the proppant released from the more viscous fluid. A partial monolayer of proppant is formed between the pillars from the neutrally buoyant proppant in the more viscous fluid and the less viscous fluid.

In another embodiment of the disclosure, a method of enhancing the productivity of hydrocarbons from a hydrocarbon-bearing reservoir is provided. In this embodiment, after fractures are created or enlarged within the reservoir, at least two proppant-laden fluids of differing viscosity are simultaneously pumped into the reservoir. The proppant of each of the fluids is the same, the proppant comprising a proppant neutrally buoyant in the fluid and a heavier proppant having an apparent specific gravity greater than or equal to 2.45. The amount of neutrally buoyant proppant and heavier proppant in each of the proppant-laden fluids is the same. A placement pattern for the proppants in the fracture is established by viscous fingering of the two proppant-laden fluids of differing viscosity within the created or enlarged fracture. The well is then shut-in. Heavier proppant is then released from the less viscous fluid. The released heavier proppant from the less viscous slurry is then consolidated on an upper portion of the more stable fluid and/or at a pinch point in the width of the fracture. At least two vertically extending pillars are created within the reservoir from the proppant released from the less viscous fluid, the placement of the pillars being determined by the viscous fingering pattern developed by the two proppant-laden fluids. The more viscous fluid is then degraded and the heavier proppant is released. The heavier proppant released from the more viscous fluid adds to the proppant which has established the vertically extending pillars. Conductive channels are created within the reservoir between the vertically extending pillars. The fracture between the vertically extending pillars may be braced open with the neutrally buoyant proppant from the more stable and/or less stable fluid.

In another embodiment, a method of increasing the conductivity of a fracture network within a subterranean formation penetrated by a well is provided. In this embodiment, after the creation or enlargement of fractures within the subterranean formation, two proppant-laden fluids of differing viscosity are simultaneously pumped into the well. The more viscous fluid is more stable than the less viscous fluid. The fluid of each of the proppant-laden fluids is the same. The amount of proppant in each of the proppant-laden fluids is the same. The proppant in each of the proppant-laden fluids is the same. The proppant in each of the proppant-laden fluids contains a proppant neutrally buoyant in the fluid and a heavier proppant which is not neutrally buoyant in the fluid. The less viscous fluid is degraded and vertically extended pillars are created within the formation from proppant released from the less viscous fluid. The more viscous fluid is then degraded. The volume of the fracture is then filled with the proppant released from the more viscous fluid onto the pillars.

In another embodiment, a method of pillar fracturing a hydrocarbon-bearing subterranean formation penetrated by a well is provided. In this method, at least two slurries of differing viscosity are simultaneously introduced into the well subsequent to the creation or enlargement of fractures within the subterranean formation. Each of the slurries contains suspended proppant. The proppant in the slurries is the same and is a mixture of proppant neutrally buoyant in the fluid of the slurry and a heavier proppant having an apparent specific gravity greater than or equal to 2.45. The amount of neutrally buoyant proppant and heavier proppant in each of the at least two proppant-laden slurries is the same. The shape and/or placement of the proppant pillar to be created within the subterranean formation is controlled during the simultaneous pumping of the proppant-laden slurries while the proppant-laden slurries are in a dynamic state by fingering the proppant-laden slurries into the created or enlarged fractures. The heavy proppant is then released from the less viscous slurry while the less viscous slurry is in a static state. At least two vertically extended pillars are created within the subterranean formation from the heavy proppant released from the less viscous slurry. The heavy proppant suspended in the more viscous slurry is released while the more viscous slurry is in a static state. The vertically extended pillars are then built from the proppant released from the more viscous slurry. Conductive channels are created within the subterranean formation between the vertically extending pillars. The fracture between the vertically extended pillars may be braced open with the neutrally buoyant proppant from the more viscous and/or less viscous slurry.

In another embodiment, a method of increasing the conductivity of a fracture network within a subterranean formation penetrated by a well. In this method, subsequent to the creation or enlargement of fractures within the formation, two fluids of differing viscosity are continuously and simultaneously introduced into the well. The two fluids are composed of a carrier and a mixture of the same proppants. The proppants are suspended in the carrier. The carrier of each of the fluids is the same. One of the proppants in the mixture in each of the fluids is neutrally buoyant in the carrier and the heavier proppant in each of the fluids is not neutrally buoyant in the carrier, the less viscous fluid being less stable than the more viscous fluid. The heavier proppant is released from the less viscous fluid and travels to the top of the more stable fluid positioned in the fracture and/or at a pinch point in the width of the fracture. The traveling of the heavier proppant is due to gravitational forces within the created or enlarged fracture. At least two pillars are formed within the subterranean formation from the heavier proppant released from the less viscous fluid and the heavier proppant released from the more viscous fluid. A partial monolayer of proppant is created between the pillars from the neutrally buoyant proppant in the more viscous fluid and the less viscous fluid.

In another embodiment, a method of increasing the conductivity of a fracture network within a subterranean formation penetrated by a well is provided. In this embodiment, after creating one or more fractures in the formation, two fluids of different viscosity are continuously and simultaneously pumped into the well. The two fluids contain a carrier and identical proppant. The proppant is a mixture of a proppant neutrally buoyant in the carrier of the fluid and a heavier proppant not neutrally buoyant in the carrier of the fluid. The less viscous fluid is less stable than the more viscous fluid. Proppant is released from the less viscous fluid and the proppant then settles within the formation. At least two pillars are formed within the formation from the proppant released from the less viscous fluid and from proppant released from the more viscous fluid. A partial monolayer of proppant between pillars may be formed from the neutrally buoyant proppant which may remain suspended in the carrier of the more viscous fluid as well as neutrally buoyant proppant which may remain suspended in the carrier of the less viscous fluid. The partial monolayer inhibits closure of the fracture.

In another embodiment of the disclosure, a method of increasing the conductivity of a fracture network within a formation is provided wherein, subsequent to a hydraulic fracturing operation, two aqueous proppant-laden slurries having identical proppant are continuously and simultaneously pumped into a well penetrating the formation. The concentration of proppant in the two aqueous proppant-laden slurries may or may not be the same. The proppant in each of the slurries contains a mixture of proppant neutrally buoyant in the fluid of the slurry and a heavier proppant not neutrally buoyant in the fluid of the slurry. One of the slurries is less viscous and less stable than the other. The heavier proppant is released from the less stable slurry first after completion of the pumping of fluids into the well but while the created or extended fractures initiated during the hydraulic fracturing operation are open and while the less stable slurry and more stable slurry are both in a static state. At least two pillars are formed within the formation from the heavy proppant released from the less stable slurry and the heavy proppant released from the more stable slurry. A conductive channel is created between the pillars. The conductive channel is maintained between the pillars with the neutrally buoyant proppant which remains in the more stable and the less stable slurries.

In another embodiment of the disclosure, a method of increasing the conductivity of a fracture network within a subterranean formation penetrated by a well is provided. In this embodiment, two aqueous proppant-laden slurries of differing viscosity are simultaneously pumped into the well after the formation has been subjected to a hydraulic fracturing operation. The more viscous slurry is more stable than the less viscous slurry. The fluid of each of the proppant-laden slurries is the same. The proppant in each of the proppant-laden slurries is the same and comprises a mixture of a relatively lightweight proppant in the fluid of the slurry (preferably neutrally buoyant in the fluid of the slurry) and a heavier proppant which is not neutrally buoyant in the fluid of the slurry. The less viscous slurry is degraded and vertically extending pillars are created within the formation from proppant released from the less viscous slurry. The more viscous fluid is then degraded and the heavy proppant of the more viscous fluid falls from suspension and fills the volume of the fracture onto the pillars. A partial monolayer of proppant may be created from the relatively lightweight proppant in areas between the pillars.

In another embodiment, a method of enhancing the productivity of hydrocarbons from a hydrocarbon-bearing formation is provided wherein subsequent to creating or enlarging one or more fractures within the subterranean formation, a first fluid laden with a proppant mixture and a second fluid laden with a proppant mixture are simultaneously pumped into a well penetrating the hydrocarbon-bearing formation. The first fluid exhibits greater stability than the second fluid. The first fluid may have a volumetric mass density greater than the volumetric mass density of the second fluid. The first fluid may be more viscous than the second fluid. The proppant mixture of the first fluid and the proppant mixture of the second fluid may be the same and have at least two proppants wherein a first proppant has an apparent specific gravity greater than the apparent specific gravity of a second proppant. The proppant mixture of the first fluid and the proppant mixture of the second fluid may be the same and have at least two proppants wherein the average particle size of one proppant is greater than the average particle size of the other proppant. The second fluid is degraded and the first proppant is released from the second fluid. The released proppant from the second fluid may be consolidated on an upper portion of the first fluid and/or at a pinch point in the width of the fracture. The released proppant from the second fluid may then be introduced into the width of the fracture and two or more pillars may be created within the fracture from the released proppant. The first fluid is then degraded and the first proppant is released from the first fluid onto the created two or more pillars. A channel may then be created in the subterranean formation between the two or more pillars with the second proppant in the first fluid and the second proppant in the second fluid.

In another embodiment of the disclosure, a method of pillar fracturing a hydrocarbon-bearing subterranean formation penetrated by a well is provided. In this method, at least two fluids laden with a proppant mixture are simultaneously pumped into the well after the creation or enlargement of fractures within the subterranean formation. One of the fluids (a first fluid) exhibits greater stability than another (second) fluid. The volumetric mass density of the first fluid may be greater than the volumetric mass density of the second fluid. The first fluid may be more viscous than the second fluid. The proppant mixture of the first fluid and the proppant mixture of the second fluid may be the same and have at least two proppants wherein a first proppant has an apparent specific gravity greater than the apparent specific gravity of a second proppant. The proppant mixture of the first fluid and the proppant mixture of the second fluid may be the same and contain at least two proppants wherein the average particle size of a first proppant is greater than the average particle size of a second proppant. The two proppant-laden fluids may be subjected to viscous fingering within the created or enlarged fracture. A placement pattern is developed for the first proppant of the first fluid and second fluid in the fracture. The well may then shut in and the first proppant may then be released from the second fluid. The released first proppant from the second fluid is then consolidated on an upper portion of the first fluid and/or at a pinch point in the width of the fracture. At least two vertically extending pillars are created within the formation from the first proppant released from the second fluid. The placement of the vertically extending pillars is determined by the viscous fingering pattern of the two proppant-laden fluids subjected to viscous fingering. The first fluid is then degraded and at least two vertically extending pillars are built from the first proppant released from the first fluid. Conductive channels are created within the subterranean formation between the vertically extending pillars. The fracture is then braced open between the vertically extending pillars with the second proppant from the first fluid and/or less stable fluid.

In yet another embodiment of the disclosure, a method of increasing the conductivity of a fracture network within a subterranean formation penetrated by a well is provided. In this method, two aqueous proppant-laden slurries wherein a first slurry exhibits greater stability than a second are simultaneously introduced into the well after fractures are created. The proppant mixture of the first fluid and the proppant mixture of the second slurry are the same and contain at least two proppants. A first proppant may have an apparent specific gravity greater than the apparent specific gravity of a second proppant. Alternatively, or in addition, the proppant mixture of the first slurry and the proppant mixture of the second slurry may be the same and have at least two proppants wherein the average particle size of a first proppant is greater than the average particle size of a second proppant. After termination of the hydraulic fracturing operation but while the created fractures are open, the first proppant is released from the second slurry while both the second slurry and the first slurry are in a static state. At least two pillars are formed within the subterranean formation by releasing the first proppant from the first slurry and second slurry. A conductive channel between the pillars is created. The conductive channel between the pillars is maintained with the second proppant remaining in the first slurry and the second slurry.

In still another embodiment, a method of pillar fracturing a hydrocarbon-bearing subterranean formation penetrated by a well is provided wherein subsequent to the creation or enlargement of fractures within the subterranean formation, at least two fluids laden with a proppant mixture are pumped into the well. One of the fluids (first fluid) exhibits greater stability than a second fluid. The viscosity of the first fluid may be greater than the viscosity of the second fluid. The volumetric mass density of the first fluid may be greater than the volumetric mass density of the second fluid. The proppant mixture of the first fluid and the proppant mixture of the second fluid may be the same and contain at least two proppants wherein a first proppant has an apparent specific gravity greater than the apparent specific gravity of a second proppant. The proppant mixture of the first fluid and the proppant mixture of the second fluid may be the same and contain at least two proppants wherein the average particle size of a first proppant is greater than the average particle size of a second proppant. Control of the shape and/or placement of the proppant pillar to be created within the formation may be effectuated by fingering the first fluid and the second fluid into the created or enlarged fractures during the simultaneous pumping of the fluids and while the fluids are in a dynamic state. The first proppant is then released from the second fluid while the second fluid is in a static state. At least two vertically extended pillars are created within the formation from the first proppant released from the second fluid. The first proppant suspended in the first fluid is then released while the first fluid is in a static state. The first proppant released from the first fluid then builds onto the vertically extended pillars. Conductive channels are created within the subterranean formation between the vertically extending pillars. The fracture between the vertically extended pillars is braced with the second proppant from the first and/or second fluid.

DESCRIPTION OF DRAWINGS

The following figures are part of the present specification, included to demonstrate certain aspects of various embodiments of this disclosure and referenced in the detailed description herein.

FIG. 1A depicts a cross-sectional view of a fracture, after closure, illustrating conductive flow channels between pillars created by the method disclosed herein performed after a conventional fracturing treatment. FIG. 1B depicts a cross sectional view of a fracture, after closure, illustrating a conventional fracturing treatment that does not include the treatment operation disclosed herein.

FIG. 2A and FIG. 2B depict a top view and side view, respectively of a fracture, after closure, illustrating conductive flow channels between pillars created by the pillar fracturing method disclosed herein. FIG. 2C and FIG. 2D depict a top view and a side view, respectively, of a fracture, after closure, illustrating a conventional pillar fracturing method.

FIG. 3 is a two dimensional depiction of a fracture, after closure of the fracture, and after the simultaneous pumping of two slurries containing a mixture of proppants wherein the apparent specific gravity of one proppant is greater than the apparent specific gravity of another proppant.

DETAILED DESCRIPTION

Illustrative embodiments of the invention are described below as they might be employed in the operation and treatment of a fracturing operation. In the interest of clarity, not all features of an actual implementation are described in this specification. It will of course be appreciated that in the development of any such actual embodiment, numerous implementation and/or specific decisions must be made to achieve the specific goals of the operator, which will vary from one implementation to another. Moreover, it will be appreciated that such a development effort might be complex and time-consuming, but may nevertheless be a routine undertaking for those of ordinary skill in the art having the benefit of this disclosure. Further aspects and advantages of the various embodiments of the invention will become apparent from consideration of the following description.

Certain terms are used herein and in the appended claims to refer to particular stages. As one skilled in the art will appreciate, different persons may refer to a stage and the components of a stage by different names. This document does not intend to distinguish between components that differ or stages in name but not function. Also, the terms "including" and "comprising" are used herein and in the appended claims in an open-ended fashion, and thus should be interpreted to mean "including, but not limited to . . . ." Further, reference herein and in the appended claims to aspects in a singular tense does not necessarily limit the present disclosure or appended claims to only one such aspect, but should be interpreted generally to mean one or more, as may be suitable and desirable in each particular instance.

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

The disclosure relates to a method of distributing proppant in a spatial arrangement within a created or enlarged fracture. The formation may first be propagated by introducing into the formation a fluid at a pressure sufficient to create, enlarge or propagate the fracture. Such fracturing operations include conventional fracturing operations wherein a long primary bi-wing fracture is first created perpendicular to the minimum stress orientation and wherein pumping of fracturing fluid into the wellbore extends the planar or primary fracture while limiting extensions of secondary fractures near the wellbore. Further, the formation may be first propagated in a slickwater fracturing operation. Such stimulation operations are more characteristic in the treatment of low permeability formations, including tight gas reservoirs, such as shale formations. The fracturing operation may further be an operation typically used to enhance the complexity of a fracture network especially for increasing the productivity of hydrocarbons far field from the wellbore as well as near wellbore. Such operations do are distinct from the traditional bi-wing fracturing operations. See, for instance, U.S. Pat. Nos. 8,371,383; 9,194,223; U.S. Patent Publication No. 2014/00143381; U.S. Patent Publication No. 2013/0341030; and U.S. Patent Publication No. 2014/0299318, all of which are herein incorporated by reference.

The stage, which initiates the fracture, may include any conventional proppant, including any of the proppants defined in this disclosure. In some instances, it is desirable to pump into the formation an acid in order to etch the surface of the formation prior to subjecting the formation to pillar fracturing.

After the creation of a fracture or enlargement of an existing fracture in the subterranean reservoir, a mixture of fluids or slurries are pumped into the formation. The fluids or slurries are preferably pumped into the formation simultaneously. The fluids or slurries are typically continuously pumped in stages. The pulse rate of any stage pumped into the well containing the fluid or slurry may range from about 15 seconds to about 5 minutes. One of the fluids or slurries pumped into the formation is more stable than another fluid or slurry pumped into the formation. The more stable fluid or slurry is more resistant to degradation at in-situ conditions.

Typically, two fluids or slurries are pumped into the formation. The term "first slurry" or "first fluid" as used herein shall refer to the fluid or slurry of greater stability. The term "second slurry" or "second fluid" shall refer to the fluid or slurry of lesser stability.

The fluids or slurries pumped into the formation contain a mixture of proppants. At least one of the proppants in each of the fluids or slurries may have an apparent specific gravity greater than another proppant in the fluid or slurry. The average particle size of a proppant in each of the fluids or slurries may be greater than the average particle size of another proppant in the fluid or slurry. Further, one of the proppants in each of the fluids or slurries may have an apparent specific gravity greater than another proppant in the fluid or slurry as well as have an average particle size greater than the average particle size of the other proppant in the fluid or slurry.

As used herein a "first proppant" shall refer to the proppant in each of the fluids or slurries that has the greater apparent specific gravity and/or larger particle size. The "second proppant" shall refer to the proppant in each of the fluids or slurries that has the apparent specific gravity less than that of the first proppant and/or the particle size smaller than the particle size of the first proppant. It is understood that either the "first proppant" and "second proppant" or both "the first proppant" and the "second proppant" in the fluids or slurries may refer to a mixture of proppants. Where the "first proppant" and/or "second proppant" contains more than one proppant, each proppant in the "first proppant" has an apparent specific gravity greater than the apparent specific gravity of each proppant in the "second proppant" and/or the particle size of each proppant in the "first proppant" is greater than the particle size of each proppant in the "second proppant".

The carrier fluid of the fluid or slurry may be any carrier fluid suitable for transporting a mixture of proppant into a formation fracture in a subterranean well. Such carrier fluids include, but are not limited to, salt water, fresh water, liquid hydrocarbons, natural gas, foam, carbon dioxide, nitrogen or other gases.

The fluids or slurries (hereinafter used interchangeably) pumped into the formation differ in stability. The difference in stability may be due to the more stable slurry being more viscous than another slurry. The difference in stability may also be due to one slurry having a volumetric mass density greater than the volumetric mass density of the other slurry. The difference in stability may also be due to one slurry being more viscous than the other slurry and having a volumetric mass density greater than the volumetric mass density of the other slurry.

The differences in stability and/or volumetric mass density in the slurries may be attributable to in-situ formation conditions, such as temperature and pressure.

In addition, the differences in stability and/or volumetric mass density in the slurries may be attributable one or more agents in the fluid which are known to enhance or weaken the stability of a proppant laden slurry. (As used herein the term, "proppant laden slurry" or "proppant laden fluid" shall refer to a slurry or a fluid containing a proppant.)

Typically, each of the fluids is gelled by the inclusion of a conventional viscosifying agent, such as a viscosifying polymer or viscoelastic fluid. The fluid may further contain a conventional crosslinking agent to enhance the desired viscosity of the fluid. For instance, the viscosity of the more stable fluid may be greater than or equal to 600 cP at formation temperature while the viscosity of the less stable fluid may be less than 300 cP at formation temperature.

Typically, any or all of the viscosifying agents, crosslinking agents, gel stabilizers, breakers, pH control agents, etc. in the two slurries may be the same. For instance, both of the slurries may contain (a) the same viscosifying agent and crosslinking agent; (b) the same gel stabilizer and breaker; (c) the same viscosifying agent, crosslinking agent, gel stabilizer and breaker, etc. The selection of any of these materials as well as the amount of such materials are used to control the viscous nature and/or volumetric mass density and the stability of the fluids. Unlike methods conventionally employed, the pillar fracturing defined herein typically uses the same proppant in each of the stages. While the amount of proppant may be varied in between pulsed stages, the proppant mixture is typically pumped in each of the pulsed stages at a constant rate. The stability of the proppant slurries is governed by materials in the pumped slurries other than the proppant.

For instance, the stability of the fluid may be modified by varying the amount (or presence) of the gel stabilizer. As an example, the gel stabilizer may be present in the more stable fluid but not in the less stable fluid or a more effective amount for gel stabilization may be present in the more viscous fluid and/or fluid of higher volumetric mass density (more stable fluid) than the less viscous fluid and/or the fluid of lower volumetric mass density (less stable fluid).

As another alternative, each of the fluids may contain different viscosity and/or stability controlling materials. For instance, the viscosifying agent(s), crosslinking agent(s), gel stabilizer(s), breaker(s) and/or pH buffer(s) in one fluid may be different from the viscosifying agent(s), crosslinking agent(s), gel stabilizer(s), breaker(s) and/or pH buffer(s) in the other fluid. As an example, the less stable fluid may contain a less effective gel stabilizer loading than the gel stabilizer loading applied to the more stable fluid.

As another example, the loading of the breaker in the more stable fluid may be less than the loading of breaker in the less stable fluid. Thus, the less stable fluid will be programmed to break earlier than the more stable fluid due to the presence of the amount of breaker in the less stable fluid.

In another alternative, the loading of gel stabilizer, crosslinking agent or viscosifying agent in the more viscous fluid or fluid of higher volumetric mass (more stable fluid) may be greater than the loading of gel stabilizer, crosslinker or viscosifying agent in the less viscous fluid and/or fluid of lower volumetric mass (less stable fluid).

Alternatively, or in addition to varying the loading of gel stabilizer, crosslinker or viscosifying agent, a less stable fluid may be differentiated from a more stable fluid by varying the pH of the fluid. As an example, the stability of a fluid may be enhanced by buffering the pH of the fluid to a pH which is less than optimum for degradation of the crosslinked fluid by the breaker. Since the pH of the fluid is less than optimum for the selected breaker to break the gellant of the slurry, the slurry would exhibit greater stability (greater difficulty in breaking) than the fluid containing the optimal pH for the breaker to effectively destabilize the gellant.

As another example, the concentration of breaker in the more stable fluid may be less than optimum for breakage of the viscous fluid by the selected breaker. Degradation of the crosslinked fluid with the lower amount of breaker may take longer than degradation of the crosslinked fluid having a higher amount of breaker.

Thus, the difference in stability between the slurries may be attributable to the slurries having different viscosifying agent(s), crosslinking agent(s), gel stabilizer(s), breaker(s) and/or pH control agent(s). The difference in stability between the slurries may be attributable to the slurries having different amounts of viscosifying agent(s), crosslinking agent(s), gel stabilizer(s), breaker(s) and/or pH control agent(s). Further, the difference in stability between the slurries may be attributable to the use of different viscosifying agent(s), crosslinking agent(s), gel stabilizer(s), breaker(s) and/or pH control agent(s)s as well as different amounts of viscosifying agent(s), crosslinking agent(s), gel stabilizer(s), breaker(s) and/or pH control agent(s).

The fluid being pulsed in each of the stages is typically the same except for the stability controlling material. In other words, at each pulse the fluid is preferably either stabilized or destabilized by changing the viscosifying agent(s), crosslinking agent(s), gel stabilizer(s), breaker(s) and/or pH buffer(s) or the amount of such materials. Thus, the viscosity and stability of the slurry is varied without changing the proppant and the concentration of proppant in the fluid. As such, it is not necessary for the operator to turn on and off the proppant as required in step-changed pillar fracturing.

The requisite pattern for pillar placement as determined through modeling may make it desirable to vary the viscosity and/or volumetric mass density and stability of one of the fluids in order to promote viscous fingering of the two fluids during pumping while in dynamic motion within the fracture. Typically, the stability of the less viscous fluid is varied at a pulse rate between from about 15 seconds to about 5 minutes, more typically from about 30 seconds to 2 minutes; the pulse rate being entirely dependent on formation, wellbore, and hydraulic fracturing parameters.

The first proppant and/or second proppant in either the first fluid or second fluid may be a relatively lightweight proppant. The term "relatively lightweight" as used herein shall refer to a particulate that has an apparent specific gravity (ASG) (API RP 60) that is substantially less than a conventional particulate material employed in hydraulic fracturing or sand control operations, e.g., sand (having an ASG, API RP 60, of 2.65) or an ASG similar to these materials.

For instance, the term "relatively lightweight" shall include ultra-lightweight (ULW) density proppants having an ASG less than 2.25, preferably less than or equal to 2.0, more preferably less than or equal to 1.75, most preferably less than or equal to 1.25 and often less than or equal to 1.05.

The relatively lightweight proppant is preferably capable of being suspended in the fluid of the slurry. In a preferred embodiment, the proppant of lower ASG in the slurry is substantially neutrally buoyant in the fluid of the slurry. The term "substantially neutrally buoyant" as used herein shall refer to a relatively lightweight particulate that has an ASG sufficiently close to the ASG of the viscous fluid which allows pumping and satisfactory placement of the proppant/particulate using the selected ungelled or weakly gelled carrier fluid. For example, urethane resin-coated ground walnut hulls having an ASG of from about 1.25 to about 1.35 may be employed as a substantially neutrally buoyant proppant/particulate in completion brine having an ASG of about 1.2.

Exemplary lightweight proppants include resin coated ceramic proppants or a synthetic organic particle such as polyamides, polystyrene-divinylbenzene beads, nylon pellets, ceramics, etc. Suitable proppants further include those set forth in U.S. Pat. Nos. 7,494,711; 7,713,918 and 7,931,087, herein incorporated by reference. The proppant may be a plastic or a plastic composite such as a thermoplastic or thermoplastic composite or a resin or an aggregate containing a binder, including plastic beads. Other suitable relatively lightweight proppants are those particulates disclosed in U.S. Pat. Nos. 6,364,018, 6,330,916 and 6,059,034, all of which are herein incorporated by reference. These may be exemplified by ground or crushed shells of nuts (pecan, almond, ivory nut, brazil nut, macadamia nut, etc); ground or crushed seed shells (including fruit pits) of seeds of fruits such as plum, peach, cherry, apricot, etc.; ground or crushed seed shells of other plants such as maize (e.g. corn cobs or corn kernels), etc.; processed wood materials such as those derived from woods such as oak, hickory, walnut, poplar, mahogany, etc. including such woods that have been processed by grinding, chipping, or other form of particalization. Preferred are ground or crushed walnut shell materials coated with a resin to substantially protect and water proof the shell. Such materials may have an ASG of from about 1.25 to about 1.35.

Further use of a lightweight proppant is a cashew nutshell liquid (CNSL), a natural, non-food chain, and annually renewable biomaterial. Cashew nutshell liquid exhibits ultra-high closure stress capability and typically has an apparent specific gravity around 1.05.

In addition to relatively lightweight proppants, the first fluid and second fluid may contain heavier proppants, i.e., proppants having an apparent specific gravity greater than 2.25, most typically those having an apparent specific gravity greater than or equal to 2.65 such as sand, quartz, ceramic, silica, glass and bauxite.

In addition, the slurry may be laden with a mixture of relatively lightweight proppants, a mixture of heavier proppants as well as a mixture of relatively lightweight proppants and heavier proppants.

Typically, the amount of proppant in each of the slurries is between from about 1 to about 10, more typically between from about 3 to about 6, pounds per gallon. Where the first fluid and/or second fluid contains a mixture of relatively lightweight proppant and heavier proppant, the weight ratio of the mixture of relatively light weight proppant to heavier proppant in the slurry is typically between from about 1:1 to 1:100, more typically between from about 1:50 to about 1:3.

In a preferred embodiment, the fluids pumped simultaneously into the well has the same proppants and the same concentration of proppants. The proppant mixture thus may consist of one proppant having a lower ASG than the other. Typically, the proppant mixture contains only two proppants of varying ASG though a mixture of proppants of varying density could be used as well. Thus, for example, each of the proppant laden slurries may contain one or more relatively lightweight proppants, one or more heavier proppants having an apparent specific gravity greater than or equal to 2.65 or a combination of one or more relatively lightweight proppants and one or more heavier proppants.

In another preferred embodiment, the fluids pumped simultaneously into the well have the same proppants and the same concentration of proppants. The average particle size of the first proppant in the mixture is greater than the average particle size of the second proppant in the mixture. Typically, the average particle size of the first proppant is at least 40 to 80 percent greater than the average particle size of the second proppant. Thus, the proppants of the proppant mixture of the first fluid and the proppant mixture of the second fluid may be the same and comprises at least two proppants wherein the average particle size of one proppant is greater than the average particle size of the other proppant.

The slurries pumped simultaneously into the well exhibit different viscosities. The viscosity ratio of the two fluids is typically maintained during the pumping of fluids into the well (the dynamic state). The more viscous slurry is typically at least 1.3 times, more typically at least 1.5 times, the viscosity of the less viscous slurry. Typically, the viscosity ratio of the more viscous to less viscous slurry is less than 10:1, preferably less than 5:1, more preferably about 2:1. In some embodiment, the viscosity ratio may be as high as 50:1. Typically, the less viscous fluid will be greater than 100 cP and the more viscous fluid less than 2,000 cP viscosity, more preferably the less viscous fluid will be greater than 200 cP and the more viscous fluid less than 1,000 cP viscosity (viscosities herein measured herein using a Fann 50 C Rheometer or equivalent using procedures as defined in API RP 13M).

In another embodiment, the volumetric mass density of the first fluid is greater than the volumetric mass density of the second fluid. In an embodiment, the volumetric mass density of the first fluid may be 40 to 80 percent greater than the volumetric mass density of the second fluid. The size of the proppants in the proppant mixture will depend on the fracture widths for the particular lithology that is being subjected to treatment. In some cases, the proppants may be less than 1 mm but larger than 10 microns in size.

The pumping of slurries of different stability enable the formation of multiple irregular-shaped proppant beds or pillars at periodic points of support within the created or enlarged fracture. Such pillars hold the fracture faces of the formation apart, thereby enhancing the conductivity of the fracture. The pillars are periodically distributed over the fracture surface and are capable of supporting closure load. The support provided by the pillars keeps the fracture faces from touching one another. This bed pattern may be repeated across the fracture height. The proppant beds are permeable, as in a conventional proppant distribution but, in addition, the open fracture between beds has a flow capacity many times greater than that of the beds.

The fluids being simultaneously and continuously pumped into the well are determinative of the shape of the proppant pillar and the placement of the proppant pillar within the formation, i.e., the placement and shape of the proppant pillars are determined when the fluids are in a dynamic state. The actual creation of the pillars in-situ within the reservoir occur when the slurry is in a static state, i.e., after completion of the pumping of fluids into the reservoir.

The time for degradation of the slurry (the break time) of greater stability is longer than the time for degradation of the slurry of lesser stability. The proppant will therefore fall from the less stable fluid before the proppant in the more stable fluid is released.

As the gelation within the less viscous fluid decreases and as the less viscous slurry degrades, the first proppant (as defined herein) is released from the less stable slurry. The released proppant will accumulate on an upper portion of the more stable slurry in the fracture or in a pinch point in the fracture width to start the building of the pillar. Thus, proppant released from the slurries are impeded and stack up to form the pillars. Any amount of fracture width reduction relating to fracture closure may apply pressure on the sides of the pillar. This may act to confine and lock the pillar into place within the fracture.

Viscous fingering of the fluids when pumped promotes the building of the irregular shaped and diffused pillar pattern in the fracture. The amount and extent of the viscous fingering and the flow path during viscous fingering may be dependent on the ratio between the more stable fluid and the less stable fluid pumped into the well, characteristics of the fracture, characteristics of the formation being treated and dimensions of the fracture, as determined through modeling. Placement of the pillars within the fracture is at least partially determined by the flow path of the more stable and less stable fluids during viscous fingering within the fracture. Creation of the flow path may be dependent on pulse rate.

The formation of the pillar does not require the presence of hindered settling aids in either the more stable fluid or less stable fluid.

Further growth of the pillars occurs upon release of the proppant from the more stable slurry. This occurs as the stability of the more stable slurry decreases. As the first proppant is released from the more stable slurry, the conductive channel created during the settling of the first proppant is propped open by the pillars. The length of the conductive channel in the formation remains extended.

While a portion of the second proppant may fall with the first proppant from suspension, the second proppant, which may be neutrally buoyant in the fluid of the slurry, typically remains relatively suspended in the fluid of the two slurries (the more stable and less stable slurries) until the creation of the pillar(s). Fracture conductivity between the pillars may be enhanced by keeping the area between the pillars opened by bracing any areas of possible fracture closure with the second proppant.

Pillar fracturing as disclosed herein may be used in the treatment of conventional rock formations such as carbonate formations (like limestone, chalk and dolomite), sandstone or siliceous substrate minerals, such as quartz, clay, shale, silt, chert, zeolite, or a combination thereof. The method has further applicability in the treatment of unconventional low permeability hydrocarbon reservoir formations, such as shale, tight sandstone and coal bed methane wells including those having a permeability less than or equal to 10 mD and most especially those subterranean reservoirs having a permeability less than or equal to 1 mD. The method is especially suitable for use in deep, highly stressed wells where proppants have insufficient strength to withstand loads without crushing.

FIG. 1A is a cross-sectional view of a pillared fracture network 10 formed by the pillar fracturing method disclosed herein. FIG. 1A is contrasted with FIG. 1B which demonstrates the pathways resulting from propagation of the fractures and prior to the formation of the pillared fracture network. Referring to FIG. 1A, pillars 12 are formed within the formation from the proppant bed. Conductive channels 14 provide the pathway for hydrocarbons to be recovered from the formation. The second proppant 16 is shown as being within the conductive channel during recovery of the hydrocarbons. The pillared network is formed after completion of propagation of the fracture which results from the hydraulic fracturing operation.

FIG. 2A is a top view showing the formation of proppant pillars 12 and 13 which hold the surfaces of the fracture apart. Proppant pillars 12 and 13 are shown as defining a proppant bed composed of the first proppant from the more stable slurry as well as the less stable slurry in the form of the vertically extending pillars. Conductive flow channel 14 between proppant pillars 12 and 13 allow for the flow of produced fluid between the spaced pillars. In addition, produced fluid may flow through proppant pillars 12 and 13 when the proppant is in contact with and adjacent to a producing reservoir. Fluid containing the second proppant 16 in the fluid flows unhindered within conductive channel 14. The fluid in which the second proppant 16 is suspended is the fluid remaining after degradation of the more stable slurry and the less stable slurry. FIG. 2B, a side view, shows a second proppant 16 holding the fracture open at 17 to enhance the pathway of the conductive channel between the pillars. The formation of a partial monolayer of proppant at 17 braces the fracture against closure and thus ensures a complete flow of hydrocarbons through the channels and toward the wellbore. The second proppant suspended in the fluid which is not confined during fracture closure in a partial monolayer concentration is free to flow unbounded in the reservoir. The flow of unconfined second proppant leaves the created channels open as paths for hydrocarbons and reservoir fluid production. Typically, the second proppant will move in the direction of the fluid flow within the reservoir toward the wellbore until they encounter a resistance or meet the point where the proppant around the wellbore is positioned.

Any closure of the formation between the pillars that takes place within the created channels will be held open and remain conductive by the second proppant bracing the fracture walls apart. The second proppant thus prevents the full closure of the facture, thereby maintaining fracture conductivity.

FIG. 2C and FIG. 2D depict a top view and a side view, respectively, of a fracture, after closure, illustrating a conventional pillar fracturing method. As illustrated, the opening of conductive flow channel 16' is sustained by pillars 12' and 13'. However, when pillars 12' and 13' are too distant from each other and/or unable to provide the support to hold the fracture open, the formation faces touch each other and the fracture may close at 17'. The portion of the fracture surface area that closes severely curtails production from the reservoir. This is in contrast to the conductive flow channel of FIG. 2B which remains open at 17 by the presence of the second proppant suspended in the fluid within the channel.

The pattern for placement of the pillars and subsequent channel creation of the pillars is determined through computational fluid dynamic models known in the art. Examples of suitable models include, but are not limited to, "MFRAC" employed by Baker Hughes Incorporated and available from Meyer and Associates of Natrona Heights, Pennsylvania; "FRACPRO" from Resources Engineering Services; and "FRACPRO PT", available from Pinnacle Technology.

FIG. 3 illustrates the intermingling of the mixture of two fluids of differing viscosity within the fracture over 60 minutes, wherein the x-axis is fracture length (in feet) progressing away from a wellbore located to the far left side. The y-axis is fracture height (in feet). The difference in viscosity of the fluids promotes the viscous fingering of the fluids while in motion and within the fracture. As illustrated, the two fluids are variably dispersed within the fracture. The viscosity ratio of the more stable fluid to the less stable fluid enables the viscous fingering of the two fluids and the resulting variable fluid dispersement in the hydraulic fracture. When the viscosity ratio of the two fluids is sufficiently large, and the volumes of the two simultaneously pumped fluids are optimized, the variably in the created dispersed fluid pattern results in a pillar and channel network within the fracture that facilitates enhanced fracture conductivity.

The stability of the less stable fluid may be changed between pulsing in order to provide the requisite pillar formation as determined by computer modeling.

A fracture may be simulated using the Mfrac three-dimensional hydraulic fracturing simulator of Meyer & Associates, Inc. using a simple 3-layer isotropic homogeneous reservoir model, 40 acre spacing. The fracture may then be designed to be placed into the zone at a theoretical depth of 15,000 feet. The modeling would provide the approximate amount of proppant and the desirable pumped slurry rate as well as the rate of pumping for the proppant mixture into the reservoir for any fracture height or width. After pumping of conventional proppant into the formation, the two fluids of varying viscosity may be pumped simultaneously into the formation. The differential in viscosity between the two fluids may vary as, for example, between 200 to about 1500 cP, at times between from about 400 to about 800 cP. During each fluid pulse, the stability of the lower viscosity fluid may be changed by altering the (i) identity or amount of breaker; (ii) the gel stabilizer or the amount of gel stabilizer; (iii) the loading of the crosslinking agent or any combination thereof. The variance in the viscosity of the fluid causes the two fluids to move in conjunction with each other; the lower viscosity fluid moving faster and viscous fingering the higher viscosity fluid to create the pillar pattern.

The stability of the fluid may be changed repeatedly during successive pulsing such that the stability of the less stable fluid in the third pulsed stage may be more stable than the less stable fluid in the second pulsed stage; the stability of the less stable fluid in the fourth stage may be less stable than in the third stage, etc. Upon completion of the pulsing and prior to closure stress, the pillars are created.

Additional non-limiting examples are set forth below:

Embodiment 1

A Method of Enhancing the Productivity of Hydrocarbons from a Hydrocarbon-Bearing Formation which Comprises:

(A) subsequent to creating or enlarging one or more fractures within the subterranean formation, simultaneously pumping into a well penetrating the hydrocarbon-bearing formation a first fluid and a second fluid wherein the first fluid is more stable than the second fluid and further wherein:
  (i) the first fluid and second fluid contain the same proppant mixture comprising a first proppant and a second proppant wherein (i) the first proppant has an apparent specific gravity greater than the apparent specific gravity of the second proppant; and/or (ii) the average particle size of the first proppant is greater than the average particle size of the second proppant; and
  (ii) the first fluid has a volumetric mass density greater than the volumetric mass density of the second fluid or the first fluid is more viscous than the second fluid;
(B) degrading the second fluid and releasing the first proppant from the second fluid;
(C) consolidating the released first proppant from the second fluid on an upper portion of the first fluid and/or at a pinch point in the width of the fracture;
(D) introducing the released first proppant from the second fluid into the width of the fracture and creating at least two pillars within the fracture from the released proppant;
(E) degrading the first fluid and releasing the first proppant from the first fluid onto the created pillars; and
(F) creating a channel in the subterranean formation between pillars with the second proppant in the first fluid and the second fluid.

Embodiment 2

The method of embodiment 1, wherein the first fluid has a volumetric mass density greater than the volumetric mass density of the second fluid.

Embodiment 3

The method of embodiment 2, wherein the volumetric mass density of the first fluid is at least 40 to 80 percent greater than the volumetric mass density of the second fluid.

Embodiment 4

The method of Embodiment 1, wherein the first proppant has an apparent specific gravity greater than the apparent specific gravity of the second proppant.

Embodiment 5

The method of embodiment 1, wherein at least one of the proppants in the proppant mixture is a ceramic or sand.

Embodiment 6

The method of embodiment 5, wherein the proppant mixture comprises a ceramic and sand.

Embodiment 7

The method of embodiment 1, wherein the proppant mixture comprises at least two proppants having an apparent specific less than or equal to 2.25.

Embodiment 8

The method of embodiment 4, wherein the proppant mixture comprises at least two proppants having an apparent specific gravity greater than 2.25.

Embodiment 9

The method of embodiment 8, wherein the proppant mixture comprises at least two proppants having an apparent specific gravity greater than 2.45.

Embodiment 10

The embodiment of claim 9, wherein the proppant mixture comprises at least two proppants having an apparent specific gravity greater than 2.65.

Embodiment 11

The method of embodiment 1, wherein the first proppant has an apparent specific gravity less than or equal to 2.25 and the second proppant has an apparent specific gravity greater than 2.25.

Embodiment 12

The method of embodiment 1, wherein the viscosity of the first fluid is greater than the viscosity of the second fluid.

Embodiment 13

The method of embodiment claim 12, wherein the viscosity ratio of the more viscous slurry to the less viscous slurry is a minimum of 1.3:1.

Embodiment 14

The method of embodiment 1, further comprising creating a partial monolayer between the two or more pillars with the second proppant.

Embodiment 15

The method of embodiment 1, further comprising maintaining fracture conductivity between the by bracing the area between the with the second proppant.

Embodiment 16

The method of claim 1, wherein the average particle size of the first proppant is greater than the average particle size of the second proppant.

Embodiment 17

The method of embodiment 1, wherein the average particle size of the first proppant is at least 40 to 80 percent greater than the average particle size of the second proppant.

Embodiment 18

The method of embodiment 1, further comprising repeating altering the stability of the second fluid and repeating step (A).

Embodiment 19

The method of embodiment 1, wherein the viscosity and/or volumetric mass density of the first fluid and/or the second fluid is adjusted by varying (i) the breaker, crosslinking agent, gel stabilizer, viscosifying agent or pH buffer or a combination thereof; (ii) or the amount of breaker, crosslinking agent, gel stabilizer, viscosifying agent or pH buffer or a combination thereof; or (iii) a combination of (i) and (ii).

Embodiment 20

The method of embodiment 1, wherein at least one of the following conditions prevail:

(a) the first fluid and the second fluid contain the same breaker at the same concentration;
(b) the first fluid and the second fluid contain the same breaker in different concentrations;
(c) the first fluid and the second fluid contain a different breaker;
(d) the first fluid and the second fluid contain the same crosslinking agent at the same concentration;
(e) the first fluid and the second fluid contain the same crosslinking agent at different concentrations;
(f) the first fluid and the second fluid contain a different crosslinking agent;
(g) the first fluid and the second fluid contain the same viscosifying agent at the same concentration;
(h) the first fluid and the second fluid contain the same viscosifying agent at different concentrations;
(i) the pH of the first fluid and the second fluid is the same; or
(j) the pH of the first fluid and the second fluid is different. and prior to closure stress, the pillars are created.

Embodiment 21

A method of pillar fracturing a hydrocarbon-bearing subterranean formation penetrated by a well, the method comprising:
(A) after the creation or enlargement of fractures within the subterranean formation, simultaneously pumping into a well penetrating the hydrocarbon-bearing reservoir a first fluid and a second fluid wherein the first fluid is more stable than the second fluid:
  (i) the first fluid and second fluid contain a proppant mixture comprising at least two proppants wherein (i) the first proppant has an apparent specific gravity greater than the apparent specific gravity of the second proppant; and/or (ii) the average particle size of the first proppant is greater than the average particle size of the second proppant; and
  (ii) the first fluid has a volumetric mass density greater than the volumetric mass density of the second fluid or the first fluid is more viscous than the second fluid;
(B) viscous fingering the first and second fluids within the created or enlarged fracture and developing a placement pattern for the first proppant of the first fluid and the second fluid in the fracture;
(C) shutting in the well;
(D) releasing the first proppant from the second fluid;
(E) consolidating the released first proppant from the second fluid on an upper portion of the first fluid and/or at a pinch point in the width of the fracture;
(F) creating at least two vertically extending pillars within the formation from the first proppant released from the second fluid wherein the placement of the at least two vertically extending pillars is determined by the viscous fingering pattern of the first fluid and the second fluid of step (B);
(G) degrading the first fluid and building at least two vertically extending pillars from the first proppant released from the first fluid;
(H) creating conductive channels within the subterranean formation between the at least two vertically extending pillars; and
(I) bracing open the fracture between the at least two vertically extending pillars with the second proppant from the first fluid and/or second fluid. and prior to closure stress, the pillars are created.

Embodiment 22

The method of embodiment 21, further comprising repeating step (A) at a pulse rate between from about 15 seconds to about 5 minutes.

Embodiment 23

The method of embodiment 21, wherein the first proppant has an apparent specific gravity greater than the apparent specific gravity of the second proppant.

Embodiment 24

The method of embodiment 21, wherein the fracture is braced open between the at least two vertically extending pillars in (I) with the second proppant from the first fluid.

Embodiment 25

The method of embodiment 21, wherein the first fluid is more viscous than the second fluid.

Embodiment 26

The method of embodiment 25, wherein the difference in viscosity between the first fluid and the second fluid is between from 200 to 1500 cP.

Embodiment 27

The method of embodiment 21, wherein at least one of the following conditions prevail:
(a) the first fluid and the second fluid contain the same breaker and further wherein the amount of breaker in the second fluid is more than the amount of breaker in the first fluid; or
(b) the first fluid and the second fluid contain the same gel stabilizer and further wherein the amount of gel stabilizer in the second fluid is less than the amount of gel stabilizer in the first fluid.

Embodiment 28

The method of embodiment 21, wherein at least one of the following conditions prevail:
(a) the second fluid is less stable than the first fluid by the amount of pH buffer present in the second fluid; or
(b) the first fluid and the second fluid contain the same viscosifying agent and wherein the amount of viscosifying agent in the second fluid is less than the amount of viscosifying agent in the first fluid.
and prior to closure stress, the pillars are created.

Embodiment 29

A method of increasing the conductivity of a fracture network within a subterranean formation penetrated by a well which comprises:
(A) after creating one or more fractures in a subterranean formation by subjecting the subterranean formation to a hydraulic fracturing operation, continuously and simultaneously introducing into the well a first aqueous proppant-laden slurry and a second aqueous proppant-laden slurry wherein the first slurry exhibits greater stability than the second slurry and further wherein:
  (i) the proppant mixture of the first slurry and the proppant mixture of the second slurry are the same and comprises a first proppant and a second proppant wherein the first proppant has an apparent specific gravity greater than the apparent specific gravity of the second proppant; and/or
  (ii) the proppant mixture of the first slurry and the proppant mixture of the second slurry are the same and comprises a first proppant and a second proppant wherein the average particle size of the first proppant is greater than the average particle size of the second proppant;
(B) releasing the first proppant, after termination of the hydraulic fracturing operation but while the created one or more fractures are open, from the second slurry and while both the second slurry and first slurry are in a static state;
(C) forming at least two pillars within the subterranean formation from the second slurry and the first slurry from the first proppant;
(D) creating a conductive channel between the at least two pillars; and
(E) maintaining the conductive channel between the at least two pillars with the second proppant remaining in the first slurry and the second slurry.
and prior to closure stress, the pillars are created.

Embodiment 30

The method of embodiment 29, wherein the amount of proppant in the first slurry and the second slurry is the same.

Embodiment 31

The method of embodiment 29, wherein the viscosity ratio of the first slurry to the second slurry is a minimum of 1.3:1.

Embodiment 32

The method of embodiment 29, wherein the difference in viscosity between the first slurry and the second slurry is between from 200 to 1500 cP.

Embodiment 33

A method of pillar fracturing a hydrocarbon-bearing subterranean formation penetrated by a well, the method comprising:
(A) subsequent to the creation or enlargement of fractures within the subterranean formation, simultaneously pumping into a well penetrating the hydrocarbon-bearing formation at least two fluids laden with a proppant mixture wherein the at least two fluids comprise a first fluid exhibiting greater stability than a second fluid and further wherein:
  (a) the proppant mixture of the first fluid and the proppant mixture of the second fluid are the same and comprises a first proppant and a second proppant wherein the first proppant has an apparent specific gravity greater than the apparent specific gravity of the second proppant; or
  (b) the first proppant and the second proppant of the first fluid and the second fluid are the same and wherein the average particle size of the first proppant is greater than the average particle size of the second proppant;
(B) controlling the shape and/or placement of a proppant pillar to be created within the subterranean formation during the simultaneous pumping of the first fluid and the second fluid while the first fluid and the second fluid are in a dynamic state by fingering the first fluid and the second fluid into the created or enlarged fractures;
(C) releasing the first proppant from the second fluid while the second fluid is in a static state;
(D) creating at least two vertically extended pillars within the subterranean formation from the first proppant released from the second fluid;
(E) releasing the first proppant suspended in the first fluid while the more first fluid is in a static state;
(F) building onto the at least two vertically extended pillars from the first proppant released from the first fluid;
(G) creating conductive channels within the subterranean formation between the vertically extending pillars; and
(H) bracing open the fracture between the vertically extended pillars with the second proppant from the first fluid and/or second fluid. and prior to closure stress, the pillars are created.

Embodiment 34

The method of embodiment 33, wherein the first fluid has a volumetric mass density greater than the volumetric mass density of the second fluid.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:
1. A method of enhancing the productivity of hydrocarbons from a hydrocarbon-bearing formation which comprises:
(A) subsequent to creating or enlarging one or more fractures within the subterranean formation, simultaneously pumping into a well penetrating the hydrocarbon-bearing formation a first fluid and a second fluid wherein the first fluid is more stable than the second fluid and further wherein:
(i) the first fluid and second fluid contain the same proppant mixture comprising a first proppant and a second proppant wherein (i) the first proppant has an apparent specific gravity greater than the apparent specific gravity of the second proppant; and/or (ii) the average particle size of the first proppant is greater than the average particle size of the second proppant; and
(ii) the first fluid has a volumetric mass density greater than the volumetric mass density of the second fluid or the first fluid is more viscous than the second fluid;
(B) degrading the second fluid and releasing the first proppant from the second fluid;
(C) consolidating the released first proppant from the second fluid on an upper portion of the first fluid and/or at a pinch point in the width of the fracture;
(D) introducing the released first proppant from the second fluid into the width of the fracture and creating at least two pillars within the fracture from the released proppant;
(E) degrading the first fluid and releasing the first proppant from the first fluid onto the created pillars; and
(F) creating a channel in the subterranean formation between pillars with the second proppant in the first fluid and the second fluid.

2. The method of claim 1, wherein the first fluid has a volumetric mass density greater than the volumetric mass density of the second fluid.

3. The method of claim 2, wherein the volumetric mass density of the first fluid is at least 40 to 80 percent greater than the volumetric mass density of the second fluid.

4. The method of claim 1, wherein the first proppant has an apparent specific gravity greater than the apparent specific gravity of the second proppant.

5. The method of claim 1, wherein at least one of the proppants in the proppant mixture is a ceramic or sand.

6. The method of claim 5, wherein the proppant mixture comprises a ceramic and sand.

7. The method of claim 1, wherein the proppant mixture of the first fluid and the second fluid either comprises:
(a) a first proppant and second proppant having an apparent specific less than or equal to 2.25;
(b) a first proppant and second proppant having an apparent specific gravity greater than 2.25; or
(c) a first proppant having an apparent specific gravity greater than or equal to 2.25 and a second proppant having an apparent specific gravity less than 2.25.

8. The method of claim 1, wherein the viscosity of the first fluid is greater than the viscosity of the second fluid.

9. The method of claim 8, wherein the viscosity ratio of the more viscous slurry to the less viscous slurry is a minimum of 1.3:1.

10. The method of claim 1, further comprising creating a partial monolayer between the two or more pillars with the second proppant.

11. The method of claim 1, further comprising maintaining fracture conductivity between the pillars by bracing the area between the pillars with the second proppant.

12. The method of claim 1, wherein the average particle size of the first proppant is greater than the average particle size of the second proppant.

13. The method of claim 12, wherein the average particle size of the first proppant is at least 40 to 80 percent greater than the average particle size of the second proppant.

14. The method of claim 1, wherein the viscosity and/or volumetric mass density of the first fluid and/or the second fluid is adjusted by varying (i) the breaker, crosslinking agent, gel stabilizer, viscosifying agent or pH buffer or a combination thereof; (ii) or the amount of breaker, crosslinking agent, gel stabilizer, viscosifying agent or pH buffer or a combination thereof; or (iii) a combination of (i) and (ii).

15. The method of claim 1, wherein at least one of the following conditions prevail:
(a) the first fluid and the second fluid contain the same breaker at the same concentration;
(b) the first fluid and the second fluid contain the same breaker in different concentrations;

(c) the first fluid and the second fluid contain a different breaker;
(d) the first fluid and the second fluid contain the same crosslinking agent at the same concentration;
(e) the first fluid and the second fluid contain the same crosslinking agent at different concentrations;
(f) the first fluid and the second fluid contain a different crosslinking agent;
(g) the first fluid and the second fluid contain the same viscosifying agent at the same concentration;
(h) the first fluid and the second fluid contain the same viscosifying agent at different concentrations;
(i) the pH of the first fluid and the second fluid is the same; or
(j) the pH of the first fluid and the second fluid is different.

16. A method of pillar fracturing a hydrocarbon-bearing subterranean formation penetrated by a well, the method comprising:
(A) after the creation or enlargement of fractures within the subterranean formation, simultaneously pumping into a well penetrating the hydrocarbon-bearing reservoir a first fluid and a second fluid wherein the first fluid is more stable than the second fluid:
    (i) the first fluid and second fluid contain a proppant mixture comprising at least two proppants wherein (i) the first proppant has an apparent specific gravity greater than the apparent specific gravity of the second proppant; and/or (ii) the average particle size of the first proppant is greater than the average particle size of the second proppant; and
    (ii) the first fluid has a volumetric mass density greater than the volumetric mass density of the second fluid or the first fluid is more viscous than the second fluid;
(B) viscous fingering the first and second fluids within the created or enlarged fracture and developing a placement pattern for the first proppant of the first fluid and the second fluid in the fracture;
(C) shutting in the well;
(D) releasing the first proppant from the second fluid;
(E) consolidating the released first proppant from the second fluid on an upper portion of the first fluid and/or at a pinch point in the width of the fracture;
(F) creating at least two vertically extending pillars within the formation from the first proppant released from the second fluid wherein the placement of the at least two vertically extending pillars is determined by the viscous fingering pattern of the first fluid and the second fluid of step (B);
(G) degrading the first fluid and building at least two vertically extending pillars from the first proppant released from the first fluid;
(H) creating conductive channels within the subterranean formation between the at least two vertically extending pillars; and
(I) bracing open the fracture between the at least two vertically extending pillars with the second proppant from the first fluid and/or second fluid.

17. The method of claim 16, wherein the first proppant has an apparent specific gravity greater than the apparent specific gravity of the second proppant and/or the first fluid is more viscous than the second fluid.

18. The method of claim 16, wherein at least one of the following conditions prevail:
(a) the first fluid and the second fluid contain the same breaker and further wherein the amount of breaker in the second fluid is more than the amount of breaker in the first fluid;
(b) the first fluid and the second fluid contain the same gel stabilizer and further wherein the amount of gel stabilizer in the second fluid is less than the amount of gel stabilizer in the first fluid;
(c) the second fluid is less stable than the first fluid by the amount of pH buffer present in the second fluid; or
(d) the first fluid and the second fluid contain the same viscosifying agent and wherein the amount of viscosifying agent in the second fluid is less than the amount of viscosifying agent in the first fluid.

19. A method of increasing the conductivity of a fracture network within a subterranean formation penetrated by a well which comprises:
(A) after creating one or more fractures in a subterranean formation by subjecting the subterranean formation to a hydraulic fracturing operation, continuously and simultaneously introducing into the well a first aqueous proppant-laden slurry and a second aqueous proppant-laden slurry wherein the first slurry exhibits greater stability than the second slurry and further wherein:
    (i) the proppant mixture of the first slurry and the proppant mixture of the second slurry are the same and comprises a first proppant and a second proppant wherein the first proppant has an apparent specific gravity greater than the apparent specific gravity of the second proppant; and/or
    (ii) the proppant mixture of the first slurry and the proppant mixture of the second slurry are the same and comprises a first proppant and a second proppant wherein the average particle size of the first proppant is greater than the average particle size of the second proppant;
(B) releasing the first proppant, after termination of the hydraulic fracturing operation but while the created one or more fractures are open, from the second slurry and while both the second slurry and first slurry are in a static state;
(C) forming at least two pillars within the subterranean formation from the second slurry and the first slurry from the first proppant;
(D) creating a conductive channel between the at least two pillars; and
(E) maintaining the conductive channel between the at least two pillars with the second proppant remaining in the first slurry and the second slurry.

20. A method of pillar fracturing a hydrocarbon-bearing subterranean formation penetrated by a well, the method comprising:
(A) subsequent to the creation or enlargement of fractures within the subterranean formation, simultaneously pumping into a well penetrating the hydrocarbon-bearing formation at least two fluids laden with a proppant mixture wherein the at least two fluids comprise a first fluid exhibiting greater stability than a second fluid and further wherein:
    (i) the proppant mixture of the first fluid and the proppant mixture of the second fluid are the same and comprises a first proppant and a second proppant wherein the first proppant has an apparent specific gravity greater than the apparent specific gravity of the second proppant; or
    (ii) the first proppant and the second proppant of the first fluid and the second fluid are the same and wherein the average particle size of the first proppant is greater than the average particle size of the second proppant;

(B) controlling the shape and/or placement of a proppant pillar to be created within the subterranean formation during the simultaneous pumping of the first fluid and the second fluid while the first fluid and the second fluid are in a dynamic state by fingering the first fluid and the second fluid into the created or enlarged fractures;

(C) releasing the first proppant from the second fluid while the second fluid is in a static state;

(D) creating at least two vertically extended pillars within the subterranean8 formation from the first proppant released from the second fluid;

(E) releasing the first proppant suspended in the first fluid while the more first fluid is in a static state;

(F) building onto the at least two vertically extended pillars from the first proppant released from the first fluid;

(G) creating conductive channels within the subterranean formation between the vertically extending pillars; and (H) bracing open the fracture between the vertically extended pillars with the second proppant from the first fluid and/or second fluid.

* * * * *